United States Patent
Arashi et al.

[11] Patent Number: 6,160,472
[45] Date of Patent: *Dec. 12, 2000

[54] MULTILAYER VARISTOR

[75] Inventors: Tomohiro Arashi; Yukie Nakano; Atsushi Hitomi; Akira Sato; Takeshi Nomura, all of Chiba, Japan

[73] Assignee: TDK Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/621,066

[22] Filed: Mar. 22, 1996

[30] Foreign Application Priority Data

Mar. 24, 1995 [JP] Japan ................................ 7-091880

[51] Int. Cl.$^7$ ............................................. H01C 7/10
[52] U.S. Cl. ..................... 338/21; 338/20; 252/519.15; 252/520.21
[58] Field of Search ................. 338/20, 21; 252/520, 252/519.15, 520.21

[56] References Cited

U.S. PATENT DOCUMENTS

| | | | |
|---|---|---|---|
| 4,290,941 | 9/1981 | Utsumi et al. | 338/21 |
| 4,430,255 | 2/1984 | Yan | 252/512 |
| 4,819,128 | 4/1989 | Florian et al. | 361/321.3 |
| 4,855,266 | 8/1989 | Burn | 252/520 |
| 5,232,880 | 8/1993 | Wada et al. | 252/520 |
| 5,235,310 | 8/1993 | Cowman et al. | 338/21 |
| 5,318,725 | 6/1994 | Sandhage | 252/520 |
| 5,319,517 | 6/1994 | Nomura et al. | 252/520 |
| 5,335,139 | 8/1994 | Nomura et al. | 252/520 |

FOREIGN PATENT DOCUMENTS

| | | |
|---|---|---|
| 0 157 276 | 10/1985 | European Pat. Off. . |
| 0 429 653 | 6/1991 | European Pat. Off. . |
| 0 437 613 | 7/1991 | European Pat. Off. . |
| 0 610 516 | 8/1994 | European Pat. Off. . |
| 3-201503 | 9/1991 | Japan ................ 338/20 |
| 5-82386 | 4/1993 | Japan . |
| 5-275270 | 10/1993 | Japan . |
| 6-176954 | 6/1994 | Japan . |
| 6-340472 | 12/1994 | Japan . |
| 2 242 066 | 9/1991 | United Kingdom . |

OTHER PUBLICATIONS

English Translation of JP 3201503, Sho Sawasaki et al.

*Primary Examiner*—Karl D. Easthom
*Attorney, Agent, or Firm*—Oblon, Spivak, McClelland, Maier & Neustadt, P.C.

[57] ABSTRACT

A multilayer varistor comprising a varistor chip body having alternately stacked ceramic layers and internal electrode layers is provided. The ceramic layer is composed of a composite oxide containing Ti and/or Zr and Ba as a main component and Si and/or Al as a subordinate component, substantially free of Cr, and has a perovskite phase. The internal electrode layer is composed of a conductor containing a base metal such as Ni or Ni alloy as a main component. The varistor is used in an electric circuit for suppressing noise.

15 Claims, 1 Drawing Sheet

MULTILAYER VARISTOR

BACKGROUND OF THE INVENTION

1. Field of the Invention

This invention relates to a multilayer varistor of the structure wherein ceramic layers having varistor characteristics are stacked between internal electrode layers.

2. Prior Art

Varistors are utilized in low-voltage electronic equipment for absorbing high-voltage pulsative noise while bypass capacitors are utilized for removing low-voltage and high-frequency alternating noise. An advanced device having both the functions is a ceramic capacitor with varistor performance. A multilayer structure was proposed for the ceramic capacitor for reducing its size without detracting from its capacitance and reliability as disclosed in Japanese Patent Application Kokai (JP-A) Nos. 82386/1993, 275270/1993, 176954/1994, and 340472/1994.

JP-A 82386/1993, 275270/1993, and 176954/1994 disclose grain boundary insulated semiconductor ceramics based on $SrTiO_3$, which cannot fully remove alternating noise and are less effective in suppressing the rise of pulsative noise since their capacitance is low.

In JP-A 340472/1994, a multilayer ceramic capacitor with varistor performance is fabricated using a ceramic composition comprising a dielectric component containing 100 mol of $BaTiO_3$, 0.01 to 2 mol of MnO, and 0.01 to 10 mol of $Y_2O_3$, 0.01 to 1 mol of $Cr_2O_3$, and 0.5 to 10 mol of at least one glass component selected from $BaSiO_3$, $CaSiO_3$, and $(Ba_xCa_{1-x})SiO_3$ wherein $0.43 \leq x \leq 0.62$. Chromium oxide ($Cr_2O_3$) is added to the ceramic composition in order to provide varistor characteristics. This multilayer ceramic capacitor has a high dielectric constant and a high capacitance, but its surge resistance is insufficient in some applications due to the presence of chromium. In automotive electric circuits, for example, surge voltage often occurs from the motor, spark plugs and static electricity and can cause short-circuit failure of the capacitor.

SUMMARY OF THE INVENTION

An object of the present invention is to provide a multilayer varistor having an increased capacitance and improved surge resistance.

According to the invention, there is provided a multilayer varistor for use in an electric circuit for suppressing noise, comprising a varistor chip body having alternately stacked or interleaved ceramic layers and internal electrode layers. The ceramic layer includes a composite oxide containing at least one of titanium and zirconium and barium as a main component and at least one of silicon and aluminum as a subordinate component, is substantially free of chromium, and has a perovskite phase. The internal electrode layer includes a conductor containing a base metal as a main component.

Preferably, the composite oxide as the main component of the ceramic layers is of the formula:

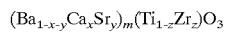

$(Ba_{1-x-y}Ca_xSr_y)_m(Ti_{1-z}Zr_z)O_3$ wherein letters x, y, z, and m representative of a molar ratio are in the range: $0 \leq x \leq 0.4$, $0 \leq y \leq 0.4$, $0 \leq z \leq 0.3$, and $0.9 \leq m \leq 1.2$, more preferably $0 \leq x+y \leq 0.1$. In a preferred embodiment, provided that silicon and aluminum as the subordinate component are calculated as $SiO_2$ and $Al_2O_3$, respectively, the sum of $SiO_2$ and $Al_2O_3$ is 0.01 to 5% by weight, more preferably up to 2% by weight of the composite oxide as the main component. Preferably, the ceramic layer further contains manganese, and provided that manganese is calculated as MnO, the content of MnO is up to 5% by weight of the composite oxide as the main component. Also preferably, the ceramic layer further contains at least one element selected from the group consisting of Mg, Fe, Co, Ni, Cu, Zn, Sn, and Sb, and provided that these elements are calculated as MgO, $Fe_2O_3$, CoO, NiO, CuO, ZnO, $SnO_2$, and $Sb_2O_3$, respectively, the total content of the oxides is up to 5% by weight of the composite oxide as the main component. Further preferably, the ceramic layer further contains at least one element selected from the group consisting of Nb, Ta, Y, W, La, Ce, Pr, Nd, Sm, Eu, Gd, Tb, Dy, Ho, Er, Tm, Yb, and Lu, and provided that these elements are calculated as $Nb_2O_5$, $Ta_2O_5$, $Y_2O_3$, $WO_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$, respectively, the total content of the oxides is up to 5% by weight of the composite oxide as the main component. Typically, the ceramic layers each have a thickness of up to 25 $\mu$m.

The conductor in the internal electrode layers is preferably nickel or a nickel alloy.

The multilayer varistor of the invention is preferably prepared by firing in an atmosphere having an oxygen partial pressure of $1 \times 10^{-8}$ to $1 \times 10^{-15}$ atm. at a temperature of 1,100 to 1,500° C. and then annealing in an atmosphere having an oxygen partial pressure of at most $1 \times 10^{-3}$ atm. at a temperature of up to 1,200° C.

The multilayer varistor of the invention has a high capacitance owing to ceramic layers of the perovskite structure based on $(Ba,Ca,Sr)(Ti,Zr)O_3$. It has nonlinear voltage-current characteristics, that is, varistor characteristics due to the inclusion of Si and/or Al in the ceramic layers. Surge resistance is improved since the ceramic layers are substantially free of chromium. Then the multilayer varistor of the invention is suitable as a noise-absorbing device, especially in applications where frequent surge occurs such as automotive electric circuits.

It is noted that the above-referred JP-A 340472/1994 describes a comparative example (sample No. 15) whose ceramic layers are free of $Cr_2O_3$ although this sample does not exhibit varistor characteristics and cannot be used as a capacitor with varistor performance as opposed to the multilayer varistor of the present invention. When the composition of the dielectric layer of sample No. 15 of this reference is expressed by a compositional formula as used in the present disclosure, the content of $SiO_2$ is 2.17% by weight of the composite oxide as a main component (provided that the composite oxide is $(Ba_xCa_{1-x})SiO_3$ wherein x=0.5), suggesting a relatively high content of $SiO_2$. As a result, its capacitance is relatively low.

BRIEF DESCRIPTION OF THE DRAWINGS

These and further features of the present invention will be apparent with reference to the following description and drawings, wherein.

The only FIGURE.

DETAILED DESCRIPTION OF THE INVENTION

Figure 1:
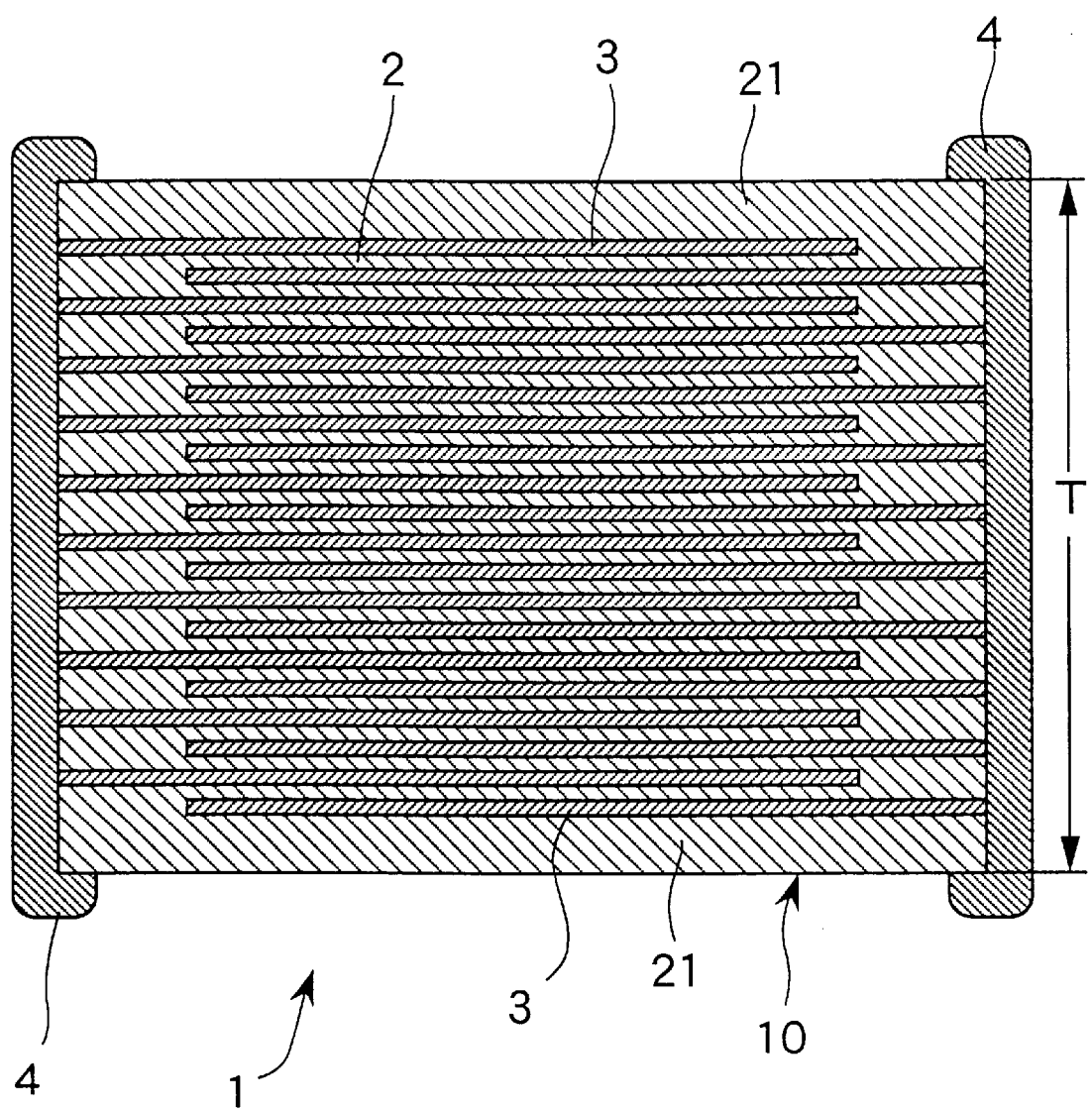
FIG. 1 is a schematic cross-sectional view of a multilayer varistor according to one embodiment of the invention.

Referring to FIG. 1, a multilayer varistor 1 according to one embodiment of the invention is illustrated as comprising a varistor chip body 10. The varistor chip body 10 includes ceramic layers 2 and internal electrode layers 3 which are alternately stacked. That is, each of the internal electrode layers 3 is stacked or interleaved between two adjacent ceramic layers 2. The varistor 1 further includes external electrodes 4 on side surfaces of the varistor chip body 10 in electrical contact with alternate ones of the internal electrode layers 3. The shape of the varistor chip body 10 is not critical although it is generally rectangular. Also the size of the varistor chip body 10 is not critical. The chip body may suitably dimensioned depending on a particular application although it is generally about 1.0–5.6 mm×0.5–5.0 mm×0.5–1.9 mm. The internal electrode layers 3 are alternately offset such that the end of every two layers is exposed at one side surface and the end of every remaining two layers is exposed at an opposite side surface of the chip body 10. The external electrodes 4 are attached to the opposite side surfaces of the chip body 10 in electrical contact with corresponding internal electrode layers to form a desired capacitor circuit.

Ceramic layer 2

The ceramic layer 2 includes a composite oxide containing titanium (Ti) and/or zirconium (Zr) and barium (Ba) as a main component. Such a main component is used because a perovskite oxide having a high dielectric constant can be formed. The composite oxide as a main component is preferably of the formula:

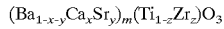

$(Ba_{1-x-y}Ca_xSr_y)_m(Ti_{1-z}Zr_z)O_3$ wherein letters x, y, z, and m representative of a molar ratio are in the range:

$0 \leq x \leq 0.4$, $0 \leq y \leq 0.4$, $0 \leq z \leq 0.3$, and $0.9 \leq m \leq 1.2$, preferably $0 \leq x \leq 0.1$, $0 \leq y \leq 0.1$, $0 \leq z \leq 0.1$, and $0.95 \leq m \leq 1.10$, more preferably $0 \leq x+y \leq 0.1$.

Values of x greater than 0.4 are undesirable because of a significant drop of dielectric constant in a low temperature region, especially below 0° C. Values of y greater than 0.4 are undesirable because of a significant drop of dielectric constant in a high temperature region, especially above 100° C. Too larger sums of x+y would be undesirable because of short sintering and insufficient densification. Values of z greater than 0.3 are undesirable because of a significant drop of dielectric constant in a high temperature region, especially above 100° C. Values of m greater than 1.2 or less than 0.9 are undesirable because of short sintering and insufficient densification.

The ceramic layer also contains silicon (Si) and/or aluminum (Al) as a subordinate component. The subordinate component forms a grain boundary phase exhibiting nonlinear voltage-current characteristics and also serves as a sintering aid. Provided that silicon and aluminum are calculated as $SiO_2$ and $Al_2O_3$, respectively, the sum of $SiO_2$ and $Al_2O_3$ is preferably 0.01 to 5% by weight, more preferably 0.1 to 3% by weight, most preferably 0.1 to 2% by weight of the composite oxide as the main component. A too low content of $SiO_2+Al_2O_3$ would fail to provide nonlinear voltage-current characteristics, that is, varistor characteristics. A too high content of $SiO_2+Al_2O_3$ would cause a significant drop of dielectric constant.

Preferably, the ceramic layer further contains manganese (Mn) as a subordinate component because manganese functions to increase a nonlinearity index (a nonlinear coefficient of voltage). Since manganese also functions to improve anti-reducing property during firing of ceramic layers, it is also effective for preventing a lowering of insulation resistance and reducing a dielectric loss tan δ. Provided that manganese is calculated as MnO, the content of MnO is preferably up to 5% by weight, more preferably up to 1% by weight of the composite oxide as the main component. An MnO content of more than 5% would lead to low insulation resistance at an applied voltage lower than the varistor voltage. An MnO content of at least 0.001% by weight, especially at least 0.005% by weight is preferred for an increased nonlinearity index and improved anti-reducing property.

Preferably the ceramic layer further contains at least one element selected from the group consisting of Mg, Fe, Co, Ni, Cu, Zn, Sn, and Sb. These elements are effective for improving the temperature response of dielectric constant. Preferred among these are at least one element of Mg, Co, and Zn. Essential inclusion of Mg is most preferred because it is effective for suppressing a change of capacitance with time in a DC electric field. Magnesium, lead and bismuth facilitate re-oxidation of ceramic layers and are effective for reducing a dielectric loss, increasing a nonlinear coefficient of voltage, and increasing a varistor voltage. Provided that Mg, Fe, Co, Ni, Cu, Zn, Sn, Sb, Pb, and Bi are calculated as MgO, $Fe_2O_3$, CoO, NiO, CuO, ZnO, $SnO_2$, and $Sb_2O_3$, respectively, the total content of the oxides is preferably up to 5% by weight, more preferably up to 1% by weight of the composite oxide as the main component. If the sum of the contents of the respective oxides is greater than 5%, there would occur drastic lowering of sinterability and insufficient densification, resulting in poor insulation resistance and a low dielectric constant. In order that the respective oxides fully exert their additive effect, the total content of the oxides is preferably at least 0.001% by weight, more preferably at least 0.01% by weight of the composite oxide as the main component.

Also preferably the ceramic layer further contains at least one element selected from the group consisting of Nb, Ta, Y, W, La, Ce, Pr, Nd, Sm, Eu, Gd, Tb, Dy, Ho, Er, Tm, Yb, and Lu. These elements are effective for rendering ceramic layers semiconductive to increase a nonlinearity index and thus improving varistor performance. Preferred among these are at least one element of Nb, Y, W, La, Ce, Nd, and Sm. Essential inclusion of Nb and/or Y is most preferred. Provided that Nb, Ta, Y, W, La, Ce, Pr, Nd, Sm, Eu, Gd, Tb, Dy, Ho, Er, Tm, Yb, and Lu are calculated as $Nb_2O_5$, $Ta_2O_5$, $Y_2O_3$, $WO_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$, respectively, the content of each oxide is preferably up to 5% by weight, more preferably up to 1% by weight of the composite oxide as the main component. If the sum of the contents of the respective oxides is greater than 5%, there would occur a substantial drop of dielectric constant. In order that the respective oxides fully exert their additive effect, the total content of the oxides is preferably at least 0.001% by weight, more preferably at least 0.005% by weight of the composite oxide as the main component.

It is understood that the oxidation state of the metal oxides in the ceramic layer is not critical. It is only necessary in preferred embodiments that the content of each of metal elements forming the oxides meets the above-mentioned requirement.

According to the invention, the ceramic layer is substantially free of chromium because an improvement in surge resistance is then expectable. A ceramic layer substantially free of chromium means that the chromium content is less than 0.0005% by weight calculated as $Cr_2O_3$ even when chromium is contained as an incidental impurity.

The ceramic layer has a perovskite phase. Crystal grains of the ceramic layer have a so-called core-shell structure that a core of $BaTiO_3$, MnO, MgO and so forth is surrounded by a shell rich in $SiO_2$, $Al_2O_3$, and semiconducting agents ($Y_2O_3$, etc.).

Grains of the ceramic layer are not particularly limited in mean grain size. Since fine grains are formed by controlling the ceramic composition as defined above, a mean grain size of about 0.2 to 0.7 μm is generally available.

Preferably the ceramic layers each have a thickness of up to 25 μm, more preferably up to 15 μm. With too thick ceramic layers, only a low capacitance is available per unit volume and it is difficult to find a compromise between size reduction and performance improvement. The thickness of the ceramic layer is generally at least 1 μm, especially at least 3 μm. Too thin ceramic layers would lead to low insulation resistance at an applied voltage lower than the varistor voltage.

The number of stacked ceramic layers is generally at least 1, preferably 2 to about 200. The term "number of stacked ceramic layers" is the number of ceramic layers interleaved between internal electrode layers. In this regard, the uppermost and lowermost ceramic layers are considered protective ceramic layers 21 provided for protection and insulation of the internal electrode layers and adjustment of the total thickness T of the varistor chip body. The thickness of the protective ceramic layers 21 is not critical and may be determined in accordance with the thickness of the internal ceramic layers and internal electrode layers, the number of stacked layers, and the total thickness T of the varistor chip body. Preferably the thickness of the protective ceramic layers 21 is at least equal to the thickness of internal ceramic layers. It is noted that re-oxidation of internal ceramic layers during annealing, to be described later, is retarded as the protective ceramic layers 21 are made thicker, and accelerated as the protective ceramic layers 21 are made thinner. Differently stated, the degree of re-oxidation of internal ceramic layers can be controlled by changing the thickness of the protective ceramic layers 21.

Internal electrode layer 3

The internal electrode layers 3 is composed of a conductor containing a base metal as a main component. A base metal can be used as the internal electrode layers 3 because the ceramic layers 2 are fired in a reducing atmosphere in order to provide semiconductive nature needed as varistors. The base metal used as the conductor is preferably selected from nickel and nickel alloys since they have a relatively high melting point. Useful nickel alloys used herein are alloys of nickel with at least one of manganese, chromium, cobalt, and aluminum, preferably with a nickel content being at least 95% by weight. It is noted that nickel and nickel alloys may contain less than about 0.1% by weight of trace elements such as phosphorus.

The thickness of the internal electrode layer may be properly determined in accordance with a particular application although it is generally about 1 to 5 μm, preferably about 2 to 3 μm.

External electrode 4

The external electrodes 4 may be composed of any desired conductor, typically nickel, copper and alloys thereof because of low cost. The thickness of the external electrode may be properly determined in accordance with a particular application although it is preferably about 10 to 50 μm.

Manufacturing method

The multilayer varistor of the invention is manufactured by preparing a green chip by conventional printing and sheeting methods using pastes, firing the chip, and printing or transferring external electrodes to it, followed by baking.

Ceramic layer-forming paste

Paste for forming ceramic layers is obtained by mixing a raw dielectric material with an organic vehicle. For the raw dielectric material, there are used composite oxides and mixtures of oxides as mentioned above. Alternatively, a choice may be made from compounds which convert into such oxides or composite oxides upon firing, for example, carbonates, oxalates, nitrates, hydroxides, and organometallic compounds. A mixture of such compounds is another useful raw dielectric material. The content of the respective compounds in the raw dielectric material is determined such that ceramic layers formed therefrom by firing may have the above-defined composition. The raw dielectric material is generally in the form of powder having a mean particle size of about 0.1 to 1 μm.

The organic vehicle is a binder in an organic solvent. The binder used for the organic vehicle is not critical and may be suitably selected from conventional binders such as ethyl cellulose. Also the organic solvent used herein is not critical and may be suitably selected from conventional organic solvents such as terpineol, butyl carbitol, acetone and toluene in accordance with a particular application method such as a printing or sheeting method.

Internal electrode layer-forming paste

Paste for forming internal electrode layers is prepared by mixing conductors such as conductive metals and alloys as mentioned above or various compounds which convert into such conductors upon firing, for example, oxides, organometallic compounds and resinates with organic vehicles as mentioned above.

External electrode-forming paste

Paste for forming external electrodes may be prepared by the same method as the internal electrode layer-forming paste.

Organic vehicle content

No particular limit is imposed on the organic vehicle content of the respective pastes mentioned above. Conventional contents, for example, about 1 to 5% by weight of the binder and about 10 to 50% by weight of the solvent are acceptable. If desired, the respective pastes may contain other additives such as dispersants, plasticizers, dielectric compounds and insulating compounds. The total content of these additives is preferably up to 10% by weight.

Preparation of green chins

Where a printing method is employed, a green chip is prepared by alternately printing the ceramic layer-forming paste and the internal electrode layer-forming paste onto a substrate of polyethylene terephthalate (PET) or the like in laminar form, cutting the laminar stack to a predetermined shape and separating it from the substrate.

Where a sheeting method is employed, a green chip is prepared by forming green sheets from the ceramic layer-forming paste, printing the internal electrode layer-forming paste on the respective green sheets, and stacking the printed green sheets.

It is noted that green sheets for forming ceramic protective layers are generally thicker than green sheets for forming ceramic layers. Often a plurality of green sheets are stacked to form a ceramic protective layer of a desired thickness.

Binder removal step

Prior to firing, binder removal may be carried out under conventional conditions, preferably under the following conditions where the internal electrode layers are formed of a base metal conductor such as nickel and nickel alloys.

Heating rate: 5–300° C./hour, especially 10–100° C./hour
Holding temperature: 200–400° C., especially 250–300° C.
Holding time: ½–24 hours, especially 5–20 hours
Atmosphere: air
Firing step The green chip is then fired in an atmosphere which may be properly determined in accordance with the type of conductor in the internal electrode layer-forming paste. Where base metals such as nickel and nickel alloys are used as the conductor, the firing atmosphere preferably has an oxygen partial pressure of $1\times10^{-8}$ to $1\times10^{-15}$ atm., preferably $1\times10^{-8}$ to $1\times10^{-12}$ atm. At an oxygen partial pressure below the range, the conductor of the internal electrode layers can be abnormally sintered and disconnected. At an oxygen partial pressure above the range, the internal electrode layers are likely to be oxidized.

The holding temperature during firing is preferably 1,100 to 1,500° C., more preferably 1,150 to 1,450° C., most preferably 1,200 to 1,400° C. Lower holding temperatures below the range would provide insufficient densification whereas higher holding temperatures beyond the range can lead to inconsistent performance due to discontinuous grain growth and a greater change of capacitance with time upon application of a DC electric field.

Conditions other than the above-mentioned are preferably as follows.

Heating rate: 50–500° C./hour, especially 200–300° C./hour
Holding time: 0.1–10 hours, especially ½ to 8 hours, most preferably 1–3 hours
Cooling rate: 50–500° C./hour, especially 200–300° C./hour The firing atmosphere is preferably a reducing atmosphere and the atmospheric gas is preferably a humidified mixture of $N_2$ and $H_2$ gases, for example.

Annealing step

Firing of the varistor chip in a reducing atmosphere is preferably followed by annealing. Annealing is effective for re-oxidizing the ceramic layers. This increases or enhances the potential barrier at grain boundaries, leading to an increased nonlinearity index.

The annealing atmosphere may have an oxygen partial pressure of at most $1\times10^{-3}$ atm., preferably $1\times10^{-8}$ to $1\times10^{-3}$ atm., more preferably $1\times10^{-6}$ to $1\times10^{-3}$ atm. The ceramic layers are short of re-oxidization at a low oxygen partial pressure below the range whereas the internal electrode layers can be oxidized above the range.

The holding temperature during annealing is preferably up to 1,200° C., more preferably 500 to 1,100° C. Lower holding temperatures below the range would oxidize the ceramic layers to a less extent leading to a shorter accelerated life. Higher holding temperatures beyond the range can cause the internal electrode layers to be oxidized leading to a reduced capacitance and to react with the ceramic material leading to a shorter accelerated life. Understandably the annealing step can be accomplished simply by heating and cooling. In this case, the holding temperature is equal to the highest temperature on heating and the holding time is zero.

Conditions other than the above-mentioned are preferably as follows.

Holding time: 0–20 hours, especially 6–10 hours
Cooling rate: 50–500° C./hour, especially 100–300° C./hour The preferred atmosphere gas used is humidified $N_2$ gas.

For humidifying nitrogen gas or a gas mixture used in the binder removal, firing and annealing steps, a wetter may be used, for example. In this regard, water temperature is preferably about 5 to 75° C.

The foregoing binder removal, firing and annealing steps may be carried out either continuously or independently.

Where the steps are continuously carried out, it is preferred to change only the atmosphere without cooling after binder removal, raise the temperature to the holding temperature for firing, effect firing, then cool, change the atmosphere when the holding temperature for annealing is reached, and effect annealing.

Where the steps are independently carried out, in the firing step, the same atmosphere as in binder removal is used while heating to the holding temperature for the binder removal step, and the temperature is raised therefrom to the holding temperature to effect firing. The firing atmosphere is maintained while cooling to the holding temperature for the annealing step. Then the above-mentioned annealing atmosphere is used while cooling from the holding temperature for the annealing step. Also in the annealing step of the independent mode, the atmosphere may be changed after heating to the holding temperature in a nitrogen gas atmosphere, or a humidified nitrogen gas atmosphere may be used throughout the annealing step.

In the present invention, by changing the firing and annealing conditions, only the varistor voltage can be widely varied without a substantial alteration of other properties.

Formation of external electrode

The thus obtained varistor chip is polished at end faces by barrel tumbling and sand blasting, for example, before the external electrode-forming paste is printed or transferred and baked to form external electrodes 4. Conditions for firing of the external electrode-forming paste include about 600 to 800° C. and about 10 minutes to about 1 hour, for example. If necessary, pads are formed on the external electrodes 4 as by plating.

The multilayer varistors of the invention thus prepared are mounted on printed circuit boards, for example, by soldering whereupon they are utilized as noise suppressing elements in various electronic circuits.

EXAMPLE

Examples of the invention are given below by way of illustration. All parts are by weight.

Example 1

Multilayer varistors as reported in Tables 1 and 2 were fabricated according to the following procedure. The following pastes were first prepared.

Ceramic layer-forming paste

A raw dielectric material was prepared by wet milling powder ingredients in a ball mill for 16 hours and spray drying the mixture. The powder ingredients were mixed in the proportion shown in Table 1. The ingredients used as the main component were $BaTiO_3$, $BaCO_3$, $CaCO_3$, $SrCO_3$, and $ZrO_2$ having a mean particle size of 0.5 μm. Oxide and non-oxide ingredients were used as the subordinate component, with the non-oxide ingredients being $MnCO_3$ and $MgCO_3$.

A paste was prepared by milling 100 parts of each raw dielectric material, 5 parts of an acrylic resin, 50 parts of methylene chloride, 20 parts of ethyl acetate, 6 parts of mineral spirit, and 4 parts of acetone in a ball mill.

Internal electrode layer-forming paste

A paste was prepared by milling 100 parts of nickel particles having a mean particle size of 0.8 μm, 40 parts of an organic vehicle (obtained by dissolving 8 parts by weight of ethyl cellulose in 92 parts of butyl carbitol), and 10 parts of butyl carbitol in a three-roll mill.

External electrode-forming paste

A paste was prepared by milling 100 parts of copper particles having a mean particle size of 0.5 μm, 35 parts of an organic vehicle (obtained by dissolving 8 parts by weight of ethyl cellulose in 92 parts of butyl carbitol), and 7 parts of butyl carbitol.

A varistor chip body was prepared by applying the ceramic layer-forming paste to a PET film to form a green sheet thereon and printing the internal electrode layer-forming paste thereon. The printed sheet was peeled from the PET film. A number of such printed sheets were placed one on another. At the start and end of stacking, a plurality of green sheets of 30 μm thick were stacked to form a protective ceramic layer. The laminate was compression bonded, obtaining a green laminate.

After cutting to a predetermined size, the green chip was continuously removed of the binder, fired, and annealed under the following conditions, obtaining a varistor chip body.

Binder removal

Heating rate: 15° C./hr.

Holding temperature: 280° C.

Holding time: 8 hours

Atmospheric gas: air

Firing

Heating rate: 200° C./hr.

Holding temperature: 1300° C.

Holding time: 2 hours

Cooling rate: 300° C./hr.

Atmospheric gas: humid $N_2$ and $H_2$ gas mixture

Oxygen partial pressure: $10^{-9}$ atm.

Annealing

Holding temperature: 900° C.

Holding time: 9 hours

Cooling rate: 300° C./hr.

Atmospheric gas: humid $N_2$ gas

Oxygen partial pressure: $10^{-5}$ atm.

For humidifying the atmosphere gases, a wetter was used at a water temperature of 35° C.

The varistor chip thus obtained was polished at end faces by sand blasting. The external electrode-forming paste was transferred to the end faces and baked in a $N_2+H_2$ gas atmosphere at 800° C. for 10 minutes to form external electrodes. There was completed a multilayer varistor sample. The ceramic layers had plane dimensions 3.2 mm×1.6 mm. The ceramic layers each were 7 μm thick. The number of stacked ceramic layers was 15. The internal electrode layers each were 2.5 μm thick. The varistor chip had a total thickness T of 0.5 mm.

The samples were examined by the following tests. The results are shown in Table 2.

Varistor properties

Varistor voltage $V_{0.1}$: a varistor voltage at a current flow of 0.1 mA

Nonlinearity index α: $1/\log(V_{1.0}/V_{0.1})$ wherein $V_{1.0}$ and $V_{0.1}$ are varistor voltages at a current flow of 1.0 mA and 0.1 mA, respectively.

Maximum energy capability: According to the Electronic Material Industry Association Standard EMAS-8302, energy handling capability was measured as the maximum energy (J) with which a percent change of varistor voltage fell within ±10% when a square wave impulse current of 2 ms was applied.

Maximum peak current: According to the Electronic Material Industry Association Standard EMAS-8302, surge resistance was measured as the maximum peak current (A) with which a percent change of varistor voltage fell within ±10% when an impulse current of 8/20 μs was applied.

Capacitor properties

Capacitance C: Using an LCR meter, a capacitance was measured under conditions: voltage 1 volt, frequency 1 kHz, and temperature 25° C.

Dielectric loss tan δ: Using an LCR meter, a dielectric loss was measured under conditions: voltage 1 volt, frequency 1 kHz, and temperature 25° C.

Insulation resistance log{IR(Ω)}: IR was a resistance when a DC voltage of 10 volts was applied at room temperature.

Electrostatic discharge test

An electrostatic discharge test was carried out according to the International Electrotechnical Commission (IEC) Standard 801-2. Using an electrostatic discharge generator according to the standard, a contact discharge test was carried out on the external electrodes in a direct application mode (10 cycles of simple discharge at severity level 4 with a voltage of 8 kV).

TABLE 1

| | Ceramic layer | | | | | | | | | |
|---|---|---|---|---|---|---|---|---|---|---|
| | Main component (molar ratio) $(Ba_{1-x-y}Ca_xSr_y)_m(Ti_{1-z}Zr_z)O_3$ | | | | Subordinate component (wt % based on main component) | | | | | |
| Sample No. | x | y | z | m | $SiO_2$ | $Al_2O_3$ | MnO | MgO | $Y_2O_3$ | etc. |
| 1* | 0.03 | 0.0002 | 0.0006 | 1.05 | 2.2 | — | 0.1 | — | 0.3 | $0.1(Cr_2O_3)$* |
| 2 | 0.03 | 0.0002 | 0.0006 | 1.05 | 2.2 | — | 0.1 | — | 0.3 | — |
| 3* | 0.03 | 0.0002 | 0.0006 | 1.05 | 1.0 | — | 0.1 | — | 0.3 | $0.1(Cr_2O_3)$* |
| 4 | 0.03 | 0.0002 | 0.0006 | 1.05 | 1.0 | — | 0.1 | — | 0.3 | — |
| 5 | 0.03 | 0.0002 | 0.0006 | 1.05 | 1.0 | — | 0.1 | 0.3 | 0.3 | — |
| 6 | 0.03 | 0.03 | 0.0006 | 1.05 | 1.0 | — | 0.1 | 0.3 | 0.3 | — |
| 7 | 0.03 | 0.0002 | 0.03 | 1.05 | 1.0 | — | 0.1 | 0.3 | 0.3 | — |
| 8 | 0.03 | 0.0002 | 0.0006 | 1.10 | 1.0 | — | 0.1 | 0.3 | 0.3 | — |
| 9 | 0.03 | 0.0002 | 0.0006 | 0.95 | 1.0 | — | 0.1 | 0.3 | 0.3 | — |
| 10* | 0.03 | 0.0002 | 0.0006 | 1.05 | —* | —* | 0.1 | 0.3 | 0.3 | — |
| 11 | 0.03 | 0.0002 | 0.0006 | 1.05 | 0.5 | 0.5 | 0.1 | 0.3 | 0.3 | — |

TABLE 1-continued

| | Ceramic layer | | | | | | | | | |
|---|---|---|---|---|---|---|---|---|---|---|
| | Main component (molar ratio) $(Ba_{1-x-y}Ca_xSr_y)_m(Ti_{1-z}Zr_z)O_3$ | | | | Subordinate component (wt % based on main component) | | | | | |
| Sample No. | x | y | z | m | $SiO_2$ | $Al_2O_3$ | MnO | MgO | $Y_2O_3$ | etc. |
| 12 | 0.03 | 0.0002 | 0.0006 | 1.05 | 1.0 | — | — | 0.3 | 0.3 | — |
| 13 | 0.03 | 0.0002 | 0.0006 | 1.05 | 1.0 | — | 0.1 | — | 0.3 | 0.1(CoO) |
| 14 | 0.03 | 0.0002 | 0.0006 | 1.05 | 1.0 | — | 0.1 | 0.3 | — | — |
| 15 | 0.03 | 0.0002 | 0.0006 | 1.05 | 1.0 | — | 0.1 | 0.3 | — | $0.2(Nb_2O_5)$ |

*outside the scope of the invention

TABLE 2

| Sample No. | Varistor voltage $V_{0.1}$ (V) | Non-linearity index α | Maximum energy capability (J) | Maximum peak current (A) | Capacitance C (nF) | Dielectric loss tan δ (%) | Insulation resistance log{IR(Ω)} | Electrostatic discharge test |
|---|---|---|---|---|---|---|---|---|
| 1* | 243 | 5.5 | 0.5 | 2 | 61 | 1.2 | 9.37 | not deteriorated |
| 2 | 506 | 7.7 | 0.5 | 8 | 62 | 1.4 | 10.12 | not deteriorated |
| 3* | 146 | 5.2 | 0.5 | 2 | 101 | 1.4 | 9.10 | not deteriorated |
| 4 | 253 | 7.3 | 0.5 | 8 | 122 | 2.4 | 10.01 | not deteriorated |
| 5 | 260 | 8.4 | 0.5 | 9 | 104 | 2.3 | 10.15 | not deteriorated |
| 6 | 203 | 7.8 | 0.5 | 8 | 85 | 2.0 | 9.44 | not deteriorated |
| 7 | 280 | 8.0 | 0.5 | 8 | 90 | 2.0 | 9.30 | not deteriorated |
| 8 | 466 | 7.3 | 0.5 | 7 | 71 | 2.5 | 10.21 | not deteriorated |
| 9 | 392 | 7.2 | 0.5 | 7 | 85 | 2.6 | 10.34 | not deteriorated |
| 10* | ---- no varistor phenomenon ---- | | | | 119 | 2.0 | 11.34 | Short-circuit failure |
| 11 | 271 | 8.3 | 0.5 | 9 | 120 | 2.1 | 10.25 | not deteriorated |
| 12 | 303 | 7.0 | 0.5 | 8 | 125 | 2.1 | 10.12 | not deteriorated |
| 13 | 189 | 8.2 | 0.5 | 8 | 95 | 2.0 | 9.56 | not deteriorated |
| 14 | 311 | 7.0 | 0.5 | 7 | 115 | 2.2 | 10.96 | not deteriorated |
| 15 | 270 | 8.3 | 0.5 | 9 | 103 | 2.3 | 10.30 | not deteriorated |

*outside the scope of the invention

It is evident from Tables 1 and 2 that the varistor samples of the invention are effective. More particularly, those varistor samples having ceramic layers of a composition falling within the scope of the invention have an increased capacitance and an increased maximum peak current (indicative of surge resistance). In contrast, sample Nos. 1 and 3 (Comparative Examples) having ceramic layers with Cr added have an insufficient maximum peak current. For sample No. 10 (Comparative Example) having ceramic layers free of $SiO_2$ and $Al_2O_3$, neither maximum energy capability nor maximum peak current could be measured because current of more than 0.1 mA did not flow until the applied voltage was increased to 1,000 volts.

In the electrostatic discharge test, no changes of varistor voltage, capacitance and insulation resistance were observed in the inventive samples. In sample No. 10 (Comparative Example), a short-circuit failure occurred, the capacitance declined below 1/10 and the insulation resistance declined below 1 kΩ both in an irreversible manner.

Sample Nos. 1 and 2 having ceramic layers with a $SiO_2$ content of more than 2% by weight had a low capacitance and an increased value of $V_{0.1}$.

Among the samples in Table 1, sample Nos. 5 and 11 to 15 showed a temperature response of capacitance which satisfied both B and X7R properties. Note that the B property is a capacitance change within ±10% in a temperature range between −25° C. and 85° C. with a reference temperature of 20° C., and the X7R property is a capacitance change within ±15% in a temperature range between −55° C. and 125° C. with a reference temperature of 25° C.

Example 2

Multilayer varistor samples were prepared as in sample No. 5 of Example 1 except that the thickness and the number of ceramic layers stacked were changed as shown in Table 3. Sample No. 19 had a total thickness T of 1.5 mm. Similar tests were made on these samples, with the results shown in Table 3. For ease of comparison, the results of sample No. 5 are also shown in Table 3.

TABLE 3

| Sample No. | Ceramic layer Thickness (μm) | Number | Varistor voltage $V_{0.1}$(V) | Non-linearity index α | Maximum energy capability (J) | Maximum peak current (A) | Capacitance C (nF) | Dielectric loss tan δ (%) | Insulation resistance $\log\{IR(\Omega)\}$ | Electrostatic discharge test |
|---|---|---|---|---|---|---|---|---|---|---|
| 16 | 3 | 15 | 108 | 8.3 | 0.5 | 7 | 238 | 2.5 | 9.54 | not deteriorated |
| 5 | 7 | 15 | 260 | 8.4 | 0.5 | 9 | 104 | 2.3 | 10.15 | not deteriorated |
| 17 | 15 | 15 | 516 | 8.4 | 0.5 | 9 | 68 | 2.2 | 10.59 | not deteriorated |
| 18 | 26 | 15 | 780 | 8.4 | 0.5 | 8 | 28 | 2.0 | 10.82 | not deteriorated |
| 19 | 7 | 150 | 56 | 7.8 | 0.5 | 11 | 1586 | 2.0 | 9.28 | not deteriorated |

As is evident from Table 3, sample No. 18 having ceramic layers of more than 25 μm thick has a sufficient maximum peak current, but a low capacitance and an extremely increased value of $V_{0.1}$. It is then less effective for noise suppression.

Example 3

Multilayer varistor samples were prepared as in Example 1 except that ceramic layers had a thickness of 3 μm and the number of ceramic layers stacked was 2 so that the resultant samples had a lower capacitance than the samples of Example 1. The ceramic layers had a composition as shown in Tables 4 and 6. Nickel particles with a mean particle size of 0.4 μm were used in the internal electrode layer-forming paste and the thickness of the internal electrode layer was changed to 1.5 μm. Other changes included a holding temperature of 240° C. among the binder removal conditions; a holding temperature of 1,260° C. and an oxygen partial pressure of $1 \times 10^{-11}$ atm. among the firing conditions; and an oxygen partial pressure of $1 \times 10^{-6}$ atm. among the annealing conditions. For sample Nos. 62 and 63 in Table 6, ceramic layers had a thickness of 25 μm.

These samples were tested as in Example 1 except for measurement of insulation resistance. The results are shown in Tables 5 and 7.

TABLE 4

| | Ceramic layer | | | | | | | | |
|---|---|---|---|---|---|---|---|---|---|
| | Main component (molar ratio) $(Ba_{1-x-y}Ca_xSr_y)_m(Ti_{1-z}Zr_z)O_3$ | | | | Subordinate component (wt % based on main component) | | | | |
| Sample No. | x | y | z | m | $SiO_2$ | $Al_2O_3$ | MnO | MgO | $Y_2O_3$ etc. |
| 20 | 0.02 | 0.0002 | 0.0006 | 1.05 | 1.50 | — | — | 0.40 | 0.3 |
| 21 | 0.02 | 0.0002 | 0.0006 | 1.05 | 1.50 | — | 0.003 | 0.40 | 0.3 |
| 22 | 0.02 | 0.0002 | 0.0006 | 1.05 | 1.50 | — | 0.030 | 0.40 | 0.3 |
| 23 | 0.02 | 0.0002 | 0.0006 | 1.05 | 1.50 | — | 0.100 | 0.40 | 0.3 |
| 24 | 0.02 | 0.0002 | 0.0006 | 1.00 | 1.50 | — | — | 0.40 | 0.3 |
| 25 | 0.02 | 0.0002 | 0.0006 | 1.10 | 1.50 | — | — | 0.40 | 0.3 |
| 26* | 0.02 | 0.0002 | 0.0006 | 1.05 | —* | —* | — | 0.40 | 0.3 |
| 27 | 0.02 | 0.0002 | 0.0006 | 1.05 | 0.50 | — | — | 0.40 | 0.3 |
| 28 | 0.02 | 0.0002 | 0.0006 | 1.05 | 3.00 | — | — | 0.40 | 0.3 |
| 29 | 0.02 | 0.0002 | 0.0006 | 1.05 | 1.50 | — | — | 0.40 | — |
| 30 | 0.02 | 0.0002 | 0.0006 | 1.05 | 1.50 | — | — | 0.40 | 1.0 |
| 31 | 0.02 | 0.0002 | 0.0006 | 1.05 | 1.50 | — | — | 0.40 | 2.0 |
| 32 | 0.02 | 0.0002 | 0.0006 | 1.05 | 1.50 | — | — | — | 0.3 |
| 33 | 0.02 | 0.0002 | 0.0006 | 1.05 | 1.50 | — | — | 0.04 | 0.3 |
| 34 | 0.02 | 0.0002 | 0.0006 | 1.05 | 1.50 | — | — | 0.20 | 0.3 |
| 35 | 0.02 | 0.0002 | 0.0006 | 1.05 | 1.50 | — | — | 1.00 | 0.3 |
| 36 | 0.05 | 0.0002 | 0.0006 | 1.05 | 1.50 | — | — | 0.40 | 0.3 |
| 37 | 0.02 | 0.03 | 0.0006 | 1.05 | 1.50 | — | — | 0.40 | 0.3 |
| 38 | 0.02 | 0.10 | 0.0006 | 1.05 | 1.50 | — | — | 0.40 | 0.3 |
| 39 | 0.02 | 0.0002 | 0.03 | 1.05 | 1.50 | — | — | 0.40 | 0.3 |
| 40 | 0.02 | 0.0002 | 0.0006 | 1.05 | 0.75 | 0.75 | — | 0.40 | 0.3 |
| 41 | 0.02 | 0.0002 | 0.0006 | 1.05 | — | 1.5 | — | 0.40 | 0.3 |
| 42 | 0.02 | 0.0002 | 0.0006 | 1.05 | 1.50 | — | 0.03 | 0.40 | 2.0 |

*outside the scope of the invention

TABLE 5

| Sample No. | Varistor voltage $V_{0,1}$ (V) | Non-linearity index α | Maximum energy capability (J) | Maximum peak current (A) | Capacitance C (nF) | Dielectric loss tan δ (%) | Electrostatic discharge test |
|---|---|---|---|---|---|---|---|
| 20 | 21.0 | 7.4 | 0.5 | 1 | 39.0 | 3.8 | not deteriorated |
| 21 | 21.5 | 7.7 | 0.5 | 1 | 38.8 | 3.8 | not deteriorated |
| 22 | 38.6 | 8.4 | 0.5 | 1 | 38.9 | 3.6 | not deteriorated |
| 23 | 110.3 | 9.0 | 0.5 | 1 | 39.1 | 3.2 | not deteriorated |
| 24 | 24.7 | 7.8 | 0.5 | 1 | 42.2 | 4.6 | not deteriorated |
| 25 | 17.4 | 6.8 | 0.5 | 1 | 38.4 | 4.0 | not deteriorated |
| 26* | ----no varistor phenomenon---- | | | | 56.7 | 3.7 | short-circuit failure |
| 27 | 9.0 | 8.1 | 0.5 | 1 | 52.4 | 3.7 | not deteriorated |
| 28 | 22.5 | 7.3 | 0.5 | 1 | 24.3 | 4.9 | not deteriorated |
| 29 | 26.5 | 7.0 | 0.5 | 1 | 39.8 | 4.2 | not deteriorated |
| 30 | 25.1 | 7.5 | 0.5 | 1 | 37.6 | 3.1 | not deteriorated |
| 31 | 20.6 | 7.6 | 0.5 | 1 | 34.5 | 2.6 | not deteriorated |
| 32 | 2.8 | 3.5 | 0.5 | 0.5 | 64.2 | 50.9 | not deteriorated |
| 33 | 5.6 | 7.1 | 0.5 | 1 | 53.6 | 12.2 | not deteriorated |
| 34 | 24.0 | 8.0 | 0.5 | 1 | 40.1 | 4.8 | not deteriorated |
| 35 | 11.9 | 7.3 | 0.5 | 1 | 38.7 | 3.2 | not deteriorated |
| 36 | 20.9 | 7.3 | 0.5 | 1 | 34.1 | 3.4 | not deteriorated |
| 37 | 19.9 | 7.2 | 0.5 | 1 | 34.8 | 3.5 | not deteriorated |
| 38 | 16.5 | 6.9 | 0.7 | 2 | 32.8 | 3.0 | not deteriorated |
| 39 | 22.9 | 7.1 | 0.5 | 1 | 36.2 | 3.5 | not deteriorated |
| 40 | 22.6 | 7.3 | 0.5 | 1 | 40.4 | 3.7 | not deteriorated |
| 41 | 24.8 | 7.2 | 0.5 | 1 | 42.9 | 3.6 | not deteriorated |
| 42 | 21.2 | 7.7 | 0.5 | 1 | 34.6 | 2.4 | not deteriorated |

*outside the scope of the invention

TABLE 6

| Sample No. | Main component (molar ratio) $(Ba_{1-x-y}Ca_xSr_y)_m(Ti_{1-z}Zr_z)O_3$ | | | | Subordinate component (wt % based on main component) | | | | | |
|---|---|---|---|---|---|---|---|---|---|---|
| | x | y | z | m | $SiO_2$ | $Al_2O_3$ | MnO | MgO | $Y_2O_3$ | etc. |
| 43 | 0.02 | 0.0002 | 0.0006 | 1.05 | 1.50 | — | 0.003 | — | — | — |
| 44 | 0.02 | 0.0002 | 0.0006 | 1.05 | 1.50 | — | 0.003 | — | — | 0.2(CoO) |
| 45 | 0.02 | 0.0002 | 0.0006 | 1.05 | 1.50 | — | 0.003 | — | — | 0.2(NiO) |
| 46 | 0.02 | 0.0002 | 0.0006 | 1.05 | 1.50 | — | 0.003 | — | — | 0.2(ZnO) |
| 47 | 0.02 | 0.0002 | 0.0006 | 1.05 | 1.50 | — | 0.003 | — | — | 0.1(PbO) |
| 48 | 0.02 | 0.0002 | 0.0006 | 1.05 | 1.50 | — | 0.003 | — | — | $0.1(Bi_2O_3)$ |
| 49 | 0.02 | 0.0002 | 0.0006 | 1.05 | 1.50 | — | 0.003 | — | — | $0.5(Nb_2O_5)$ |
| 50 | 0.02 | 0.0002 | 0.0006 | 1.05 | 1.50 | — | 0.003 | — | — | $0.1(Ta_2O_5)$ |
| 51 | 0.02 | 0.0002 | 0.0006 | 1.05 | 1.50 | — | 0.003 | — | — | $0.1(WO_3)$ |
| 52 | 0.02 | 0.0002 | 0.0006 | 1.05 | 1.50 | — | 0.003 | — | — | $0.5(La_2O_3)$ |
| 53 | 0.02 | 0.0002 | 0.0006 | 1.05 | 1.50 | — | 0.003 | — | — | $0.1(CeO_2)$ |
| 54 | 0.02 | 0.0002 | 0.0006 | 1.05 | 1.50 | — | 0.003 | — | — | $0.1(Pr_2O_3)$ |
| 55 | 0.02 | 0.0002 | 0.0006 | 1.05 | 1.50 | — | 0.003 | — | — | $0.1(Nd_2O_3)$ |
| 56 | 0.02 | 0.0002 | 0.0006 | 1.05 | 1.50 | — | 0.003 | — | — | $0.1(Sm_2O_3)$ |
| 57 | 0.02 | 0.0002 | 0.0006 | 1.05 | 1.50 | — | 0.003 | 0.40 | 2.0 | $0.1(Nb_2O_5)$ |
| 58 | 0.02 | 0.0002 | 0.0006 | 1.05 | 1.50 | — | 0.003 | 0.40 | 2.0 | $0.5(Nb_2O_5)$ |
| 59 | 0.02 | 0.0002 | 0.0006 | 1.05 | 1.50 | — | 0.003 | 0.40 | 2.0 | $1.0(Nb_2O_5)$ |
| 60 | 0.02 | 0.0002 | 0.0006 | 1.05 | 1.50 | — | 0.003 | 0.40 | 2.0 | $0.01(V_2O_5)$ |
| 61 | 0.02 | 0.0002 | 0.0006 | 1.05 | 1.50 | — | 0.003 | 0.40 | 2.0 | $0.03(MoO_3)$ |
| 62 | 0.30 | 0.35 | 0.0006 | 0.98 | 0.15 | — | 0.01 | — | — | — |
| 63 | 0.30 | 0.35 | 0.0006 | 1.00 | 0.15 | — | 0.01 | — | — | — |

TABLE 7

| Sample No. | Varistor voltage $V_{0.1}$ (V) | Non-linearity index α | Maximum energy capability (J) | Maximum peak current (A) | Capacitance C (nF) | Dielectric loss tan δ (%) | Electrostatic discharge test |
|---|---|---|---|---|---|---|---|
| 43 | 3.5 | 3.5 | 0.5 | 0.5 | 65.9 | 56.3 | not deteriorated |
| 44 | 3.3 | 3.3 | 0.5 | 0.5 | 64.6 | 55.9 | not deteriorated |
| 45 | 3.3 | 3.4 | 0.5 | 0.5 | 64.7 | 57.8 | not deteriorated |
| 46 | 3.1 | 3.3 | 0.5 | 0.5 | 68.4 | 59.1 | not deteriorated |
| 47 | 12.5 | 6.2 | 0.5 | 1 | 39.5 | 6.4 | not deteriorated |
| 48 | 13.4 | 6.5 | 0.5 | 1 | 38.9 | 5.2 | not deteriorated |
| 49 | 3.3 | 3.9 | 0.5 | 1 | 66.3 | 57.2 | not deteriorated |
| 50 | 3.4 | 4.1 | 0.5 | 0.5 | 64.8 | 54.4 | not deteriorated |
| 51 | 3.5 | 4.1 | 0.5 | 0.5 | 65.1 | 55.7 | not deteriorated |
| 52 | 3.3 | 4.0 | 0.5 | 1 | 66.0 | 56.4 | not deteriorated |
| 53 | 3.4 | 4.0 | 0.5 | 0.5 | 66.2 | 57.1 | not deteriorated |
| 54 | 3.3 | 4.0 | 0.5 | 0.5 | 66.4 | 56.5 | not deteriorated |
| 55 | 3.3 | 3.9 | 0.5 | 0.5 | 65.9 | 57.1 | not deteriorated |
| 56 | 3.4 | 3.9 | 0.5 | 0.5 | 66.8 | 57.0 | not deteriorated |
| 57 | 20.1 | 7.8 | 0.5 | 1 | 35.1 | 2.5 | not deteriorated |
| 58 | 17.8 | 7.9 | 0.5 | 1.5 | 36.2 | 2.7 | not deteriorated |
| 59 | 4.5 | 6.8 | 0.5 | 2 | 41.4 | 6.9 | not deteriorated |
| 60 | 57.5 | 8.6 | 0.5 | 1 | 33.9 | 2.3 | not deteriorated |
| 61 | 98.5 | 7.0 | 0.5 | 1 | 34.0 | 2.3 | not deteriorated |
| 62 | 0.8 | 2.3 | 1 | 8 | 6.5 | 655 | not deteriorated |
| 63 | 0.9 | 2.9 | 1 | 8 | 35.1 | 590 | not deteriorated |

As is evident from Tables 4 to 7, samples within the scope of the invention show satisfactory properties even when the composition, thickness, and number of ceramic layers stacked are changed. More particularly, the addition of Mn leads to an increased nonlinearity index α and a reduced dielectric loss tan δ (see sample Nos. 20 to 23). The addition of Mg leads to a significantly reduced dielectric loss tan δ, an increased varistor voltage, and an increased nonlinearity index α (see sample Nos. 32 to 35, 43, 47–48).

Example 4

Multilayer varistor samples were prepared as in sample No. 20 of Example 3 except that the thickness and the number of ceramic layers stacked and the total thickness T of a varistor chip body were changed as shown in Table 8. Similar tests were made on these samples, with the results shown in Table 8. For ease of comparison, the results of sample No. 20 are also shown in Table 8.

As is evident from Table 8, sample No. 67 having ceramic layers of more than 25 μm thick has a sufficient maximum peak current, but a low capacitance and an extremely increased value of $V_{0.1}$. It is then less effective for noise suppression.

A comparison among sample Nos. 20, 72 and 73 which are different only in the total thickness T reveals that as the total thickness T increases, that is, as the protective ceramic layers become thicker, the ceramic layers are less susceptible to re-oxidation and the varistor voltage is reduced.

Example 5

Multilayer varistor samples were prepared as in sample No. 20 of Example 3 except that firing and annealing conditions were changed as shown in Table 9. Similar tests were made on these samples, with the results shown in Table 10. For ease of comparison, the results of sample No. 20 are also shown in Table 10.

TABLE 8

| Sample No. | Chip design | | | Varistor Voltage $V_{0.1}$ (V) | Voltage non-linearity index α | Maximum energy capability (J) | Maximum peak current (A) | Capacitance C (nF) | Dielectric loss tan δ (%) | Electrostatic discharge test |
|---|---|---|---|---|---|---|---|---|---|---|
| | Ceramic layer | | Total | | | | | | | |
| | Thickness (μm) | Number | thickness T(mm) | | | | | | | |
| 20 | 3 | 2 | 0.5 | 21.0 | 7.4 | 0.5 | 1 | 39.0 | 3.8 | not deteriorated |
| 64 | 6 | 2 | 0.5 | 46.1 | 7.3 | 0.5 | 1 | 19.4 | 2.9 | not deteriorated |
| 65 | 9 | 2 | 0.5 | 75.6 | 7.2 | 0.5 | 1 | 12.8 | 2.3 | not deteriorated |
| 66 | 15 | 2 | 0.5 | 134.5 | 7.1 | 0.5 | 1 | 7.6 | 2.0 | not deteriorated |
| 67 | 30 | 2 | 0.5 | 281.7 | 7.1 | 0.5 | 1 | 3.7 | 1.6 | not deteriorated |
| 68 | 3 | 1 | 0.5 | 22.1 | 7.2 | 0.5 | 1 | 19.5 | 3.8 | not deteriorated |
| 69 | 3 | 4 | 0.5 | 18.6 | 7.8 | 0.5 | 1 | 78.1 | 3.8 | not deteriorated |
| 70 | 3 | 8 | 0.5 | 15.4 | 8.0 | 0.5 | 2 | 157.4 | 3.8 | not deteriorated |
| 71 | 3 | 16 | 0.5 | 9.9 | 8.4 | 0.5 | 2 | 313.9 | 3.8 | not deteriorated |
| 72 | 3 | 2 | 1.0 | 16.8 | 7.6 | 0.5 | 1 | 39.2 | 3.8 | not deteriorated |
| 73 | 3 | 2 | 1.5 | 12.8 | 7.9 | 0.5 | 1 | 39.3 | 3.9 | not deteriorated |
| 74 | 3 | 170 | 1.2 | 4.9 | 8.6 | 0.5 | 3 | 3341 | 3.7 | not deteriorated |

TABLE 9

| | Firing | | | Annealing | | |
|---|---|---|---|---|---|---|
| Sample No. | Temperature (° C.) | Time (h) | Oxygen partial pressure (atm) | Temperature (° C.) | Time (h) | Oxygen partial pressure (atm) |
| 75 | 1180 | 2 | $1 \times 10^{-12}$ | 900 | 9 | $1 \times 10^{-6}$ |
| 76 | 1220 | 2 | $1 \times 10^{-11}$ | 900 | 9 | $1 \times 10^{-6}$ |
| 20 | 1260 | 2 | $1 \times 10^{-11}$ | 900 | 9 | $1 \times 10^{-8}$ |
| 77 | 1300 | 2 | $1 \times 10^{-10}$ | 900 | 9 | $1 \times 10^{-6}$ |
| 78 | 1260 | 0.2 | $1 \times 10^{-11}$ | 900 | 9 | $1 \times 10^{-6}$ |
| 79 | 1260 | 5 | $1 \times 10^{-11}$ | 900 | 9 | $1 \times 10^{-6}$ |
| 80 | 1260 | 2 | $1 \times 10^{-12}$ | 900 | 9 | $1 \times 10^{-6}$ |
| 81 | 1260 | 2 | $1 \times 10^{-10}$ | 900 | 9 | $1 \times 10^{-6}$ |
| 82 | 1260 | 2 | $1 \times 10^{-11}$ | 800 | 1 | $1 \times 10^{-7}$ |
| 83 | 1260 | 2 | $1 \times 10^{-11}$ | 800 | 9 | $1 \times 10^{-7}$ |
| 84 | 1260 | 2 | $1 \times 10^{-11}$ | 900 | 1 | $1 \times 10^{-6}$ |
| 85 | 1260 | 2 | $1 \times 10^{-11}$ | 900 | 3 | $1 \times 10^{-8}$ |
| 86 | 1260 | 2 | $1 \times 10^{-11}$ | 900 | 18 | $1 \times 10^{-6}$ |
| 87 | 1260 | 2 | $1 \times 10^{-11}$ | 1000 | 1 | $1 \times 10^{-5}$ |
| 88 | 1260 | 2 | $1 \times 10^{-11}$ | 1000 | 9 | $1 \times 10^{-5}$ |
| 89 | 1260 | 2 | $1 \times 10^{-11}$ | 900 | 9 | $1 \times 10^{-7}$ |
| 90 | 1260 | 2 | $1 \times 10^{-11}$ | 900 | 9 | $1 \times 10^{-5}$ |

TABLE 10

| Sample No. | Varistor voltage $V_{o.1}$ (V) | Non-linearity index $\alpha$ | Maximum energy capability (J) | Maximum peak current (A) | Capacitance C (nF) | Dielectric loss tan $\delta$ (%) | Electrostatic discharge test |
|---|---|---|---|---|---|---|---|
| 75 | 10.1 | 7.0 | 0.5 | 1 | 40.2 | 4.1 | not deteriorated |
| 76 | 14.6 | 7.2 | 0.5 | 1 | 40.4 | 3.9 | not deteriorated |
| 20 | 21.0 | 7.4 | 0.5 | 1 | 39.0 | 3.8 | not deteriorated |
| 77 | 23.7 | 7.9 | 0.5 | 1 | 37.5 | 4.0 | not deteriorated |
| 78 | 23.5 | 7.2 | 0.5 | 1 | 39.6 | 3.8 | not deteriorated |
| 79 | 19.4 | 7.6 | 0.5 | 1 | 38.4 | 3.8 | not deteriorated |
| 80 | 18.4 | 7.9 | 0.5 | 1 | 39.1 | 4.0 | not deteriorated |
| 81 | 23.9 | 7.0 | 0.5 | 1 | 39.0 | 3.5 | not deteriorated |
| 82 | 8.5 | 8.9 | 0.5 | 1 | 40.5 | 3.7 | not deteriorated |
| 83 | 14.6 | 7.7 | 0.5 | 1 | 40.3 | 4.0 | not deteriorated |
| 84 | 11.9 | 7.7 | 0.5 | 1 | 40.4 | 3.8 | not deteriorated |
| 85 | 17.2 | 7.5 | 0.5 | 1 | 40.3 | 3.9 | not deteriorated |
| 86 | 25.3 | 6.9 | 0.5 | 1 | 39.9 | 4.2 | not deteriorated |
| 87 | 40.1 | 7.5 | 0.5 | 1 | 40.3 | 3.8 | not deteriorated |
| 88 | 82.3 | 6.8 | 0.5 | 1 | 39.9 | 4.2 | not deteriorated |
| 89 | 17.9 | 8.1 | 0.5 | 1 | 39.8 | 3.9 | not deteriorated |
| 90 | 24.1 | 7.2 | 0.5 | 1 | 38.7 | 3.8 | not deteriorated |

It is evident from Tables 9 and 10 that by changing the firing and annealing conditions, the varistor voltage can be significantly changed without substantial influence on the remaining properties.

The results of Examples demonstrate the benefits of the invention.

Japanese Patent Application No. 91880/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A multilayer varistor for use in an electric circuit for suppressing noise, comprising a varistor chip body having alternately stacked ceramic layers and internal electrode layers, said ceramic layers consisting essentially of a composite oxide as a main component and at least one of $SiO_2$ and $Al_2O_3$ as a subordinate component, being substantially free of chromium, and wherein MgO is present in an amount of from 0.001 to 5 wt %, and having a perovskite phase, said internal electrode layers comprising a conductor which is nickel or a nickel alloy, wherein the composite oxide is of the formula:

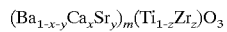

$$(Ba_{1-x-y}Ca_xSr_y)_m(Ti_{1-z}Zr_z)O_3$$

wherein letters x, y, z, and m representative of a molar ratio are in the range: 0<x<0.1, 0<y<0.1, 0<x+y<0.1, 0≦z≦0.3 and 0.9≦m≦1.2, and wherein the sum of $SiO_2$ and $Al_2O_3$ is at least 1% by weight of the composite oxide as the main component.

2. The multilayer varistor of claim 1 wherein provided that silicon and aluminum as the subordinate component are calculated as $SiO_2$ and $Al_2O_3$, respectively, the sum of $SiO_2$ and $Al_2O_3$ is 1 to 5% by weight of the composite oxide as the main component.

3. The multilayer varistor of claim 2 wherein the sum of $SiO_2$ and $Al_2O_3$ is up to 2% by weight of the composite oxide as the main component.

4. The multilayer varistor of claim 1 wherein said ceramic layers further contain manganese, and provided that manganese is calculated as MnO, the content of MnO is up to 5% by weight of the composite oxide as the main component.

5. The multilayer varistor of claim 1 wherein said ceramic layers further contain at least one element selected from the group consisting of Nb, Ta, Y, W, La, Ce, Pr, Nd, Sm, Eu, Gd, Tb, Dy, Ho, Er, Tm, Yb, and Lu, and provided that these elements are calculated as $Nb_2O_5$, $Ta_2O_5$, $Y_2O_3$, $WO_3$, $La_2O_3$, $CeO_2$, $Pr_2O_3$, $Nd_2O_3$, $Sm_2O_3$, $Eu_2O_3$, $Gd_2O_3$, $Tb_2O_3$, $DY_2O_3$, $Ho_2O_3$, $Er_2O_3$, $Tm_2O_3$, $Yb_2O_3$, and $Lu_2O_3$, respectively, the total content of the oxides is up to 5% by weight of the composite oxide as the main component.

6. The multilayer varistor of claim 1 wherein said ceramic layers each have a thickness of up to 25 $\mu$m.

7. The multilayer varistor of claim 1 which has been fired in an atmosphere having an oxygen partial pressure of $1\times10^{-8}$ to $1\times10^{-15}$ atm. at a temperature of 1,100 to 1,500° C.

8. The multilayer varistor of claim 7 which has been annealed in an atmosphere having an oxygen partial pressure of at most $1\times10^{-3}$ atm. at a temperature of up to 1,200° C. after firing.

9. The multilayer varistor of claim 1 wherein MgO is present in an amount of from 0.04 to 1 wt %.

10. The multilayer varistor of claim 1 wherein $Y_2O_3$ is present in an amount of from 0.001 to 5 wt %.

11. The multilayer varistor of claim 1 wherein $Y_2O_3$ is present in an amount of from 0.3 to 2 wt %.

12. The multilayer varistor of claim 1 wherein the crystal grains of the ceramic layer have a core-shell structure.

13. The multilayer varistor of claim 1 wherein the crystal grain of the ceramic layers have a mean grain size of 0.2 to 0.7 $\mu$m.

14. The multilayer varistor of claim 1 wherein $0.02 \leq x \leq 0.1$, $0.0002 \leq y \leq 0.1$.

15. The multilayer varistor of claim 1 wherein $0.0202 \leq x+y < 0.1$.

* * * * *

UNITED STATES PATENT AND TRADEMARK OFFICE
CERTIFICATE OF CORRECTION

PATENT NO. : 6,160,472
DATED : December 12, 2000
INVENTOR(S) : Tomohiro Arashi, et al.

Page 1 of 1

It is certified that error appears in the above-identified patent and that said Letters Patent is hereby corrected as shown below:

<u>Column 21,</u>
Line 16, "$DY_2O_3$" should read -- $Dy_2O_3$ --.

Signed and Sealed this

Twenty-eighth Day of August, 2001

*Attest:*

*Attesting Officer*

NICHOLAS P. GODICI
Acting Director of the United States Patent and Trademark Office